United States Patent
Miao

(10) Patent No.: US 7,433,382 B1
(45) Date of Patent: Oct. 7, 2008

(54) SPREAD SPECTRUM BASED MULTICHANNEL MODULATION FOR ULTRA WIDEBAND COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 704 days.

(21) Appl. No.: 10/614,366

(22) Filed: Jul. 7, 2003

(51) Int. Cl.
*H04B 1/00* (2006.01)

(52) U.S. Cl. .................. 375/141; 375/130; 375/144; 370/206; 370/208; 370/210; 370/342; 370/464

(58) Field of Classification Search ............ 370/206, 370/208, 210, 342, 464; 375/141, 144; 455/194.1; 332/103; 714/784
See application file for complete search history.

(56) References Cited

U.S. PATENT DOCUMENTS

| | | | | |
|---|---|---|---|---|
| 4,170,760 A | * | 10/1979 | Umeda .................. 455/194.1 |
| 5,396,489 A | * | 3/1995 | Harrison .................. 370/210 |
| 5,412,352 A | * | 5/1995 | Graham .................. 332/103 |
| 5,910,960 A | * | 6/1999 | Claydon et al. .......... 714/784 |
| 6,175,550 B1 | * | 1/2001 | van Nee .................. 370/206 |
| RE37,802 E | * | 7/2002 | Fattouche et al. ........ 375/141 |
| 6,490,267 B1 | * | 12/2002 | Kim et al. .................. 370/342 |
| 2003/0043887 A1 | * | 3/2003 | Hudson .................... 375/144 |

OTHER PUBLICATIONS

Ronald Crochiere & Lawrence Rabiner; Multirate Digital Signal Processing; 1983; Prentice-Hall (pp. 252-260, 290-300).*
Tewfik et al.; High Bit Rate Ultra-Wideband OFDM; Nov. 17-21, 2002; IEEE Globecom 2002; pp. 2260-2264.*
McClellan et al; A Unified Approach to the Design of Optimum FIR Linear Phase Digital Filters; Nov. 1973; IEEE Transactions on Circuit Theory; pp. 697-701.*
Bernard Sklar; Digital Communications; 2001; Prentice Hall; pp. 732-735).*

* cited by examiner

*Primary Examiner*—David C. Payne
*Assistant Examiner*—Adolf DSouza

(57) ABSTRACT

A spread spectrum based multichannel modulation Ultra-Wideband (UWB) communication transceiver for indoor wireless operations is presented according to some embodiments. The spread spectrum based multichannels are orthogonal to each other and allow for an operation in parallel. The UWB communication transceiver can also avoid interference with WLAN 802.11a devices in the same environment. In addition, the UWB communication transceiver of the present invention can transmit and receive the scalability chip data rates from 650 Mcps to 7.15 Gcps.

9 Claims, 15 Drawing Sheets

SPREAD SPECTRUM BASED MULTICHANNEL MODULATION FOR ULTRA WIDEBAND COMMUNICATIONS

BACKGROUND

This invention is generally relative to wireless spread spectrum based multichannel modulation for ultra wideband communications.

On Apr. 22, 2002, U.S. Federal Communications Commission (FCC) released the revision of Part 15 of the Commission's rules regarding ultra-wideband (UWB) transmission systems to permit the marketing and operation of certain types of new products incorporating UWB technology. With appropriate technology, UWB device can operate using spectrum occupied by existing radio service without causing interference, thereby permitting scarce spectrum resources to be used more efficiently. The UWB technology offers significant benefits for Government, public safety, businesses, and consumers under an unlicensed basis of operation spectrum.

UWB device devices can be classified in three types based on the operating restrictions: (1) imaging system including ground penetrating radars and wall, through-wall, surveillance, and medical imaging device, (2) vehicular radar systems, and (3) communications and measurement systems. In general, FCC is adapting unwanted emission limits for UWB devices that are significantly more stringent than those imposed on other Part 15 devices. Limiting the frequency band, which is based on the −10 dB bandwidth of the UWB emission, within certain UWB products will be permitted to operate. For indoor communications and measurement systems, FCC provides a wide variety of UWB devices, such as high-speed home and business networking devices as well as storage tank measurement devices under Part 15 of the Commission's rules subject to certain frequency and power limitations. The indoor UWB devices must operate in the frequency band from 3.1 GHz to 10.6 GHz. UWB communication devices should also satisfy the Part 15.209 limit, which sets the indoor FCC emission limits for UWB system, for the frequency band below 960 MHz and conform the FCC's emission mask for the frequency band above 960 MHz in Table 1:

TABLE 1

| Frequency (MHz) | EIRP (dBm) |
|---|---|
| 0-960 | −41.3 |
| 960-1610 | −75.3 |
| 1610-1990 | −53.3 |
| 1990-3100 | −51.3 |
| 3100-10600 | −41.3 |
| Above 10600 | −51.3 |

The indoor UWB devices must be designed to ensure that operation can only occur indoor or must consist of hand held devices that may be employed for such activities as peer-to-peer operation. Such UWB devices can be used for wireless communications, particularly for short-range high-speed data transmissions suitable for broadband communication access to networks.

FCC proposed to define an UWB device as any device where the fractional bandwidth is greater than 0.25 based on the formula as follows:

$$FB = 2\left(\frac{f_H - f_L}{f_H + f_L}\right), \quad (1)$$

where $f_H$ is the upper frequency of the −10 dB emission point and $f_L$ is the lower frequency of the −10 dB emission point. The center frequency of the UWB transmission is defined as the average of the upper and lower −10 dB points as follows:

$$F_C = \frac{f_H + f_L}{2}. \quad (2)$$

In addition, a minimum frequency bandwidth of 500 MHz must be used for an UWB device regardless of center frequency.

Given an entire frequency bandwidth of 7.5 GHz (3.1-10.6 GHz), it is difficult to design a transmitter and/or receiver device for a single UWB signal that occupies the entire frequency bandwidth from 3.1 GHz to 10.6 GHz directly. This is because we need to have a very-high speed A/D and D/A converter as well as a high-speed circuit and digital signal processor to operate an UWB device for the wireless communications. As a result, the cost of the UWB device could be expense. In addition, interference between the UWB and other devices, such as a WLAN 802.11a device, can occur because the WLAN 802.11a device operates in the lower frequency range from 5.15 GHz to 5.35 GHz or in the upper frequency range from 5.725 GHz to 5.825 GHz. Moreover, the UWB device may not be able to transmit data with scalability.

Due to the proliferation of 7.5 GHz UWB for wireless broadband communications, it would be desirable to have a new technology of developing one multichannel UWB solution, to reduce the interference with the WLAN 802.11a devices and to transmit and receive the transmission data rate with scalability as well as to reduce the cost for indoor UWB devices. Therefore, in this embodiment, the spread spectrum based multichannel modulation is invented for wireless indoor UWB communications.

Thus, there is a continuing need of spread spectrum based multichannel modulation for indoor UWB devices that enable a user to transmit the data rate with scalability and avoid the interference with WLAN 802.11a devices.

SUMMARY

In accordance with one aspect, a spread spectrum based multichannel modulation UWB communication transceiver consists of a pseudorandom noise (PN) sequence look-up table coupled to a multichannel PN sequence mapping, the multichannel PN sequence mapping coupled to a digital lowpass finite impulse response (FIR) shaping filter, and the digital lowpass FIR shaping filter coupled to a digital-to-analog (D/A) converter.

Other aspects are set forth in the accompanying detailed description and claims.

DETAILED DESCRIPTION

Some embodiments described herein are directed to a spread spectrum based multichannel modulation UWB communication transceiver. A UWB communication transceiver may be implemented in hardware, such as in an Application Specific Integrated Circuits (ASIC), digital signal processor, field programmable gate array (FPGA), software, or a combination of hardware and software.

Figure 1:
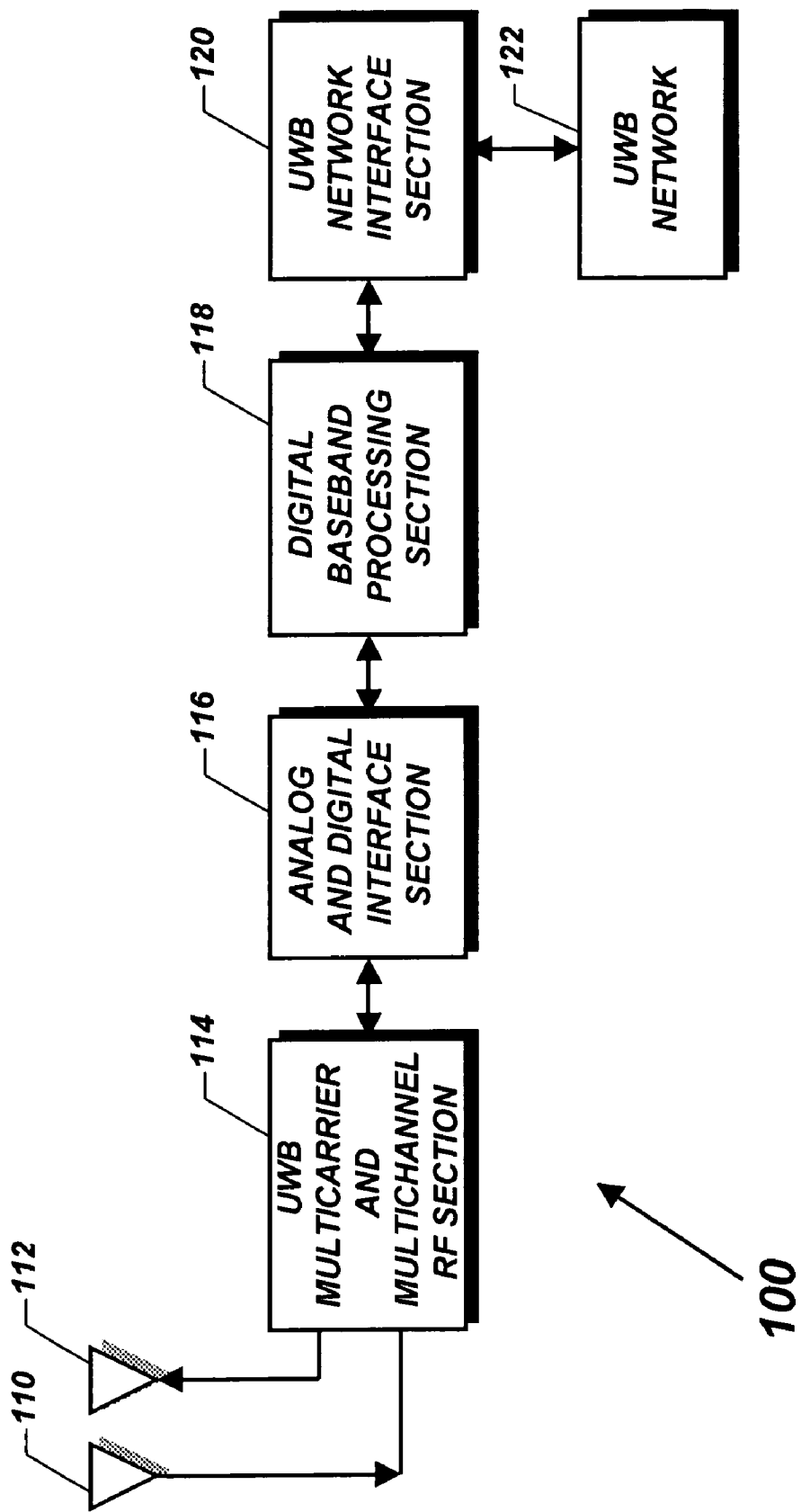
FIG. 1 is a block diagram of one embodiment of a wireless transmitter and receiver of an UWB communication transceiver using spread spectrum based multichannel modulation in accordance with the present invention.

FIG. 1 illustrates a spread spectrum based multichannel modulation for a wireless UWB communication transmitter and receiver system 100 in accordance with one embodiment of the present invention. This system 100 includes a UWB multi-carrier and multichannel RF section 114 that receives and/or transmits multichannel UWB signals from an antenna 110 or to an antenna 120. The section 114 is connected with an analog and digital interface section 116 that contains A/D and D/A converters. The interface section 116 is coupled to a digital baseband processing section 118, which performs multichannel digital filtering, rake processing, spread and de-spread processing, interleaver and de-interleaver, as well as code and de-code processing. The digital baseband processing section 118 has an interface with an UWB network interface section 120, which is coupled to an UWB network 122. In accordance with one embodiment of the present invention, the system 100 is a so-called the spread spectrum based multichannel modulation UWB transceiver that can both transmit and receive speech, audio, images and video and data information for indoor wireless communications.

According to some embodiments, the spread spectrum based multichannel modulation for the UWB communication transceiver can transmit and receive the UWB signals by using one channel and/or up to 11 channels. Each channel has a frequency bandwidth of 650 MHz that can transmit 40.625 Msps. That is, a total transmission data of passing through the 11 channels can transmit the data up to 446.875 Msps. With 16 pseudorandom noise (PN) spread sequence codes for each symbol, the transmission of data rate in each channel can achieve 650 Mcps. As a result, the spread spectrum based multichannel modulation UWB system can transmit the chip data rate up to 7.150 Gcps by using all the 11 channels.

Figure 2:
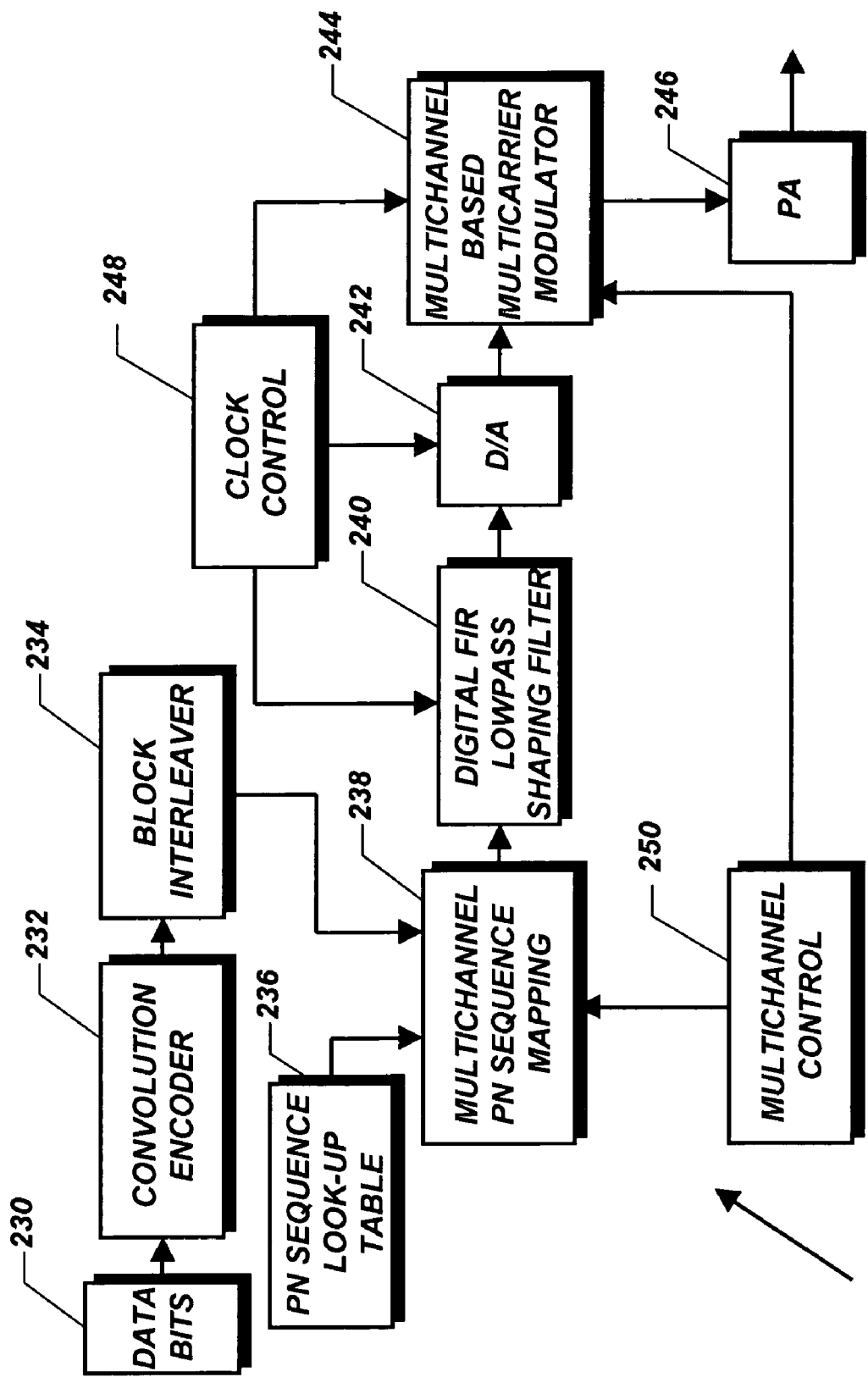
FIG. 2 is a block diagram of a spread spectrum based multichannel modulation UWB transmitter according to some embodiments.

FIG. 2 is a block diagram of a spread spectrum based multichannel modulation UWB transmitter 200 according to some embodiments. The spread spectrum based multichannel modulation UWB transmitter 200 receives user data bits 230 with information data rate of 223.4375 Mbps. The information data bits 230 are passed through a one-second-rate convolution encoder 232 that may produce the double data rate of 446.875 Msps by adding redundancy bits. The symbol data is then interleaved by using a block interleaver 234. Thus, the output symbols of the block interleaver 234 are formed 11 channels with the symbol data rate at 40.625 Msps by using a multichannel PN sequence mapping 238. The multichannel PN sequence mapping 238 is to perform spreading for each channel symbol data with 16 orthogonal spread sequence chips and to produce 650 Mcps for each channel under a multichannel control 250. A PN sequence look-up table 236 provides the unique orthogonal sequences for each channel spreading. Then each channel symbol data are sequentially passed through a digital FIR lowpass-shaping filter 240 to limit the frequency bandwidth with 650 MHz for each channel signal. Each channel signal is passed through a D/A converter 242. The output chip data of each channel from the D/A converter 242 is then modulated with a multi-carrier by using a multichannel based multi-carrier modulator 244. Thus, the output analog signals of the multichannel-based multi-carrier modulator 244 are passed through a power amplifier (PA) 246 through an antenna into air.

Figure 3A:
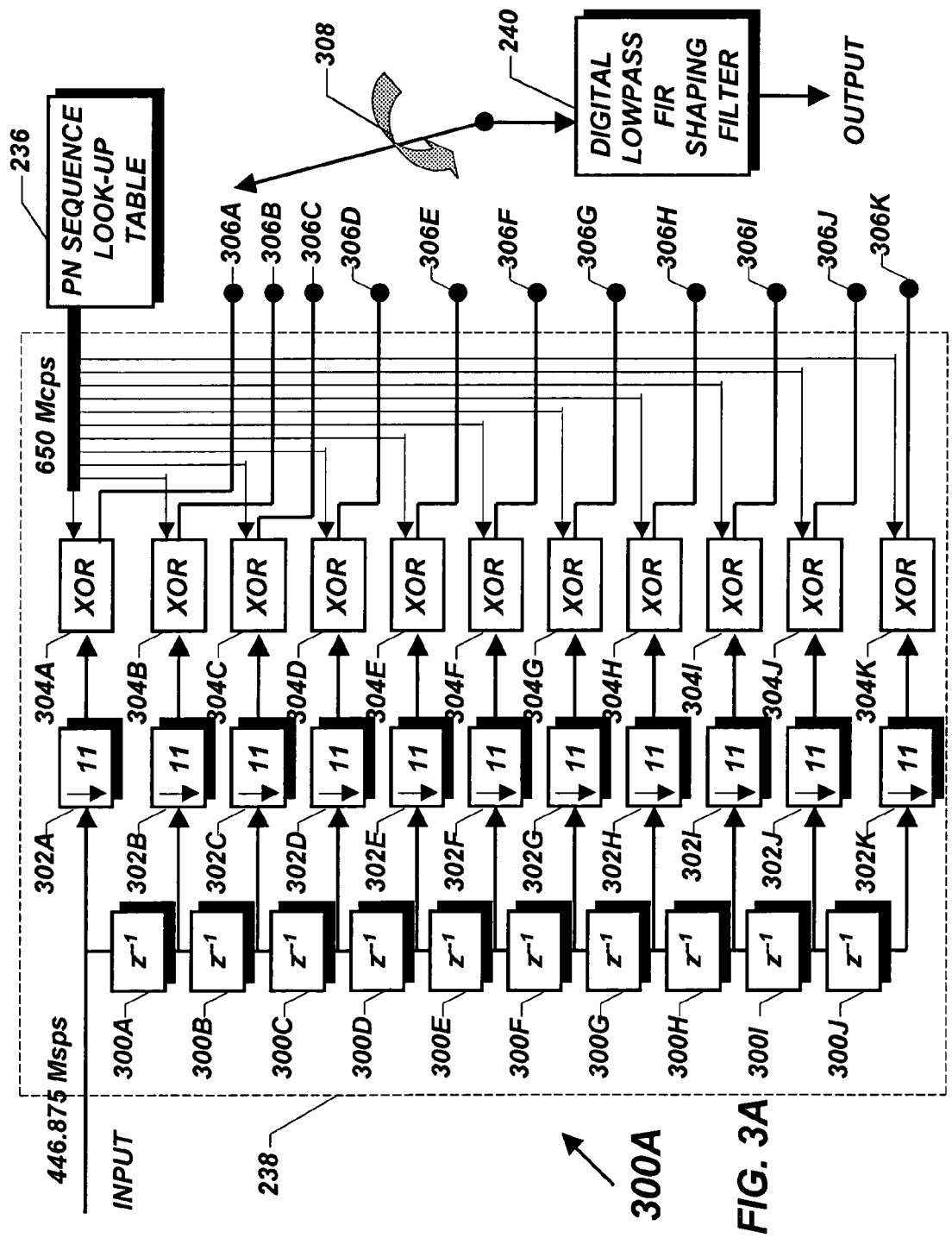
FIG. 3A is a block diagram of one embodiment of the multichannel PN sequence mapping of the present invention.

Referring to FIG. 3A is a more detailed block diagram of the multichannel PN sequence mapping 238 as shown in FIG. 2 according to some embodiments. The serial output symbol data of the block interleaver 234 at the symbol data rate of 446.875 Msps are down-sampling by a factor of 11 using delay functions $z^{-1}$ 300A-300J and down-sampling blocks 302A-302K to generate 11 channel symbol data in parallel. Each channel symbol data rate is 40.625 Msps and each channel symbol data is passed through an Exclusive OR (XOR) function 304A-304K to spread the symbol data to the chip data rate at 650 Mcps by using the 16 orthogonal spreading codes from the PN sequence look-up table 236. As a result, a total of the chip data rate in all of the 11 channels from 306A to 306K is 7.15 Gcps. Each channel 306A-306K is sequentially connected to the digital FIR lowpass-shaping filter 240 by using a switch 308, thereby producing a band-limited frequency of 650 MHz for each channel.

Figure 3B:
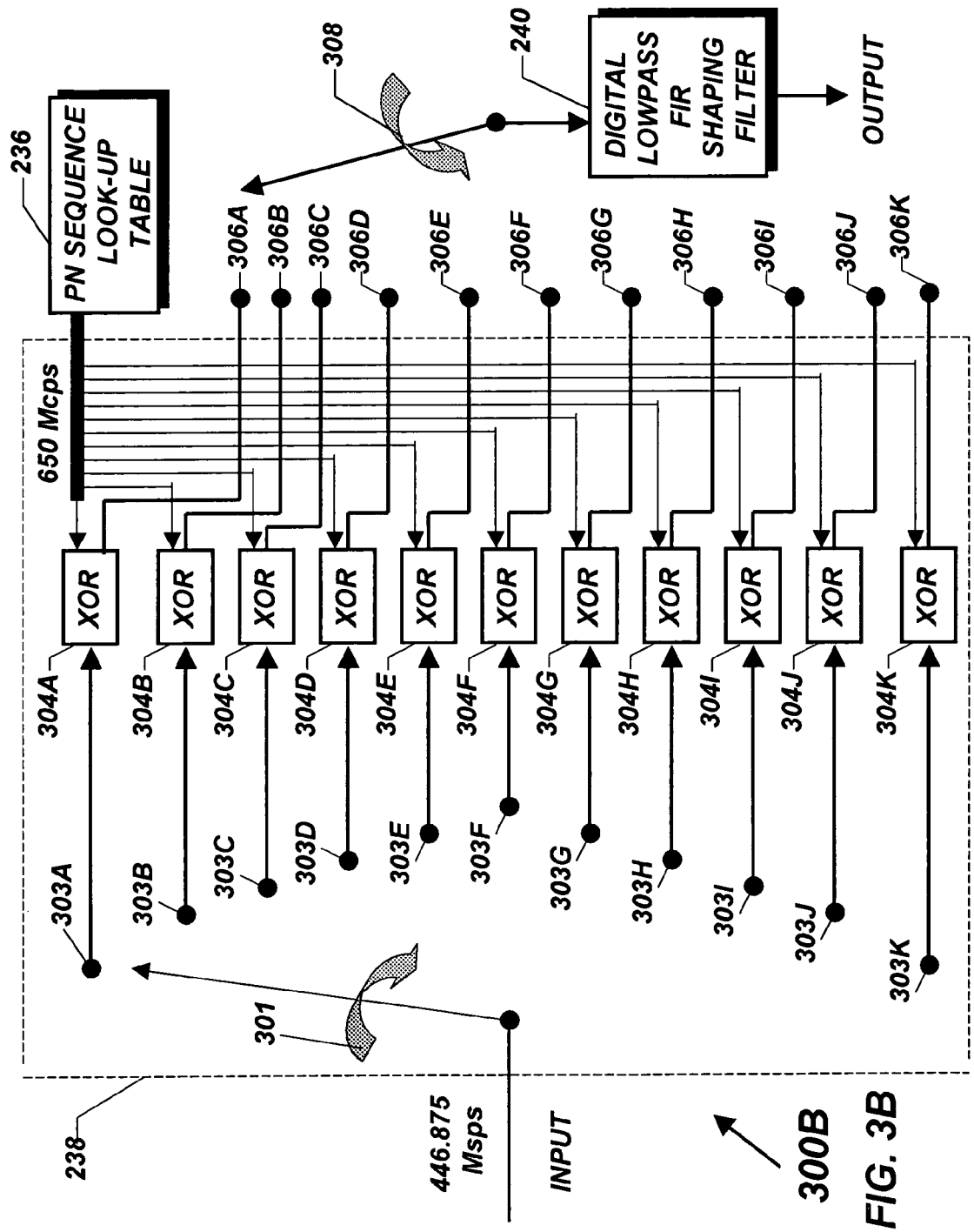
FIG. 3B is a block diagram of a polyphase implementation structure of the multichannel PN sequence mapping according to some embodiments.

Referring to FIG. 3B is an alternatively detailed block diagram 300B of implementing polyphase structure-based multichannel PN sequence mapping 238 according to a second embodiment. The serial output symbol data of the block interleaver 234 at the symbol data rate of 446.875 Msps is an input for the block diagram 300B. A polyphase switch 301 rotates in a counterclockwise direction for the decimation system to connect the positions from 303A to 303K at each of symbol data. This method generates 11-multichannel symbol data in parallel. Each channel symbol data rate is 40.625 Msps. Each channel symbol data is then passed through a XOR function 304A-304K to spread the symbol data to the chip data rate at 650 Mcps by using the 16 orthogonal spreading codes from the PN sequence look-up table 236. As a result, a combination of the chip data rate in all of the 11 channels from 306A to 306K is 7.15 Gcps. Each channel 306A-306K is sequentially connected to the digital FIR lowpass-shaping filter 240 by using a switch 308 at each 16-chip data, thereby producing a bandlimited frequency of 650 MHz for each channel.

Figure 4:
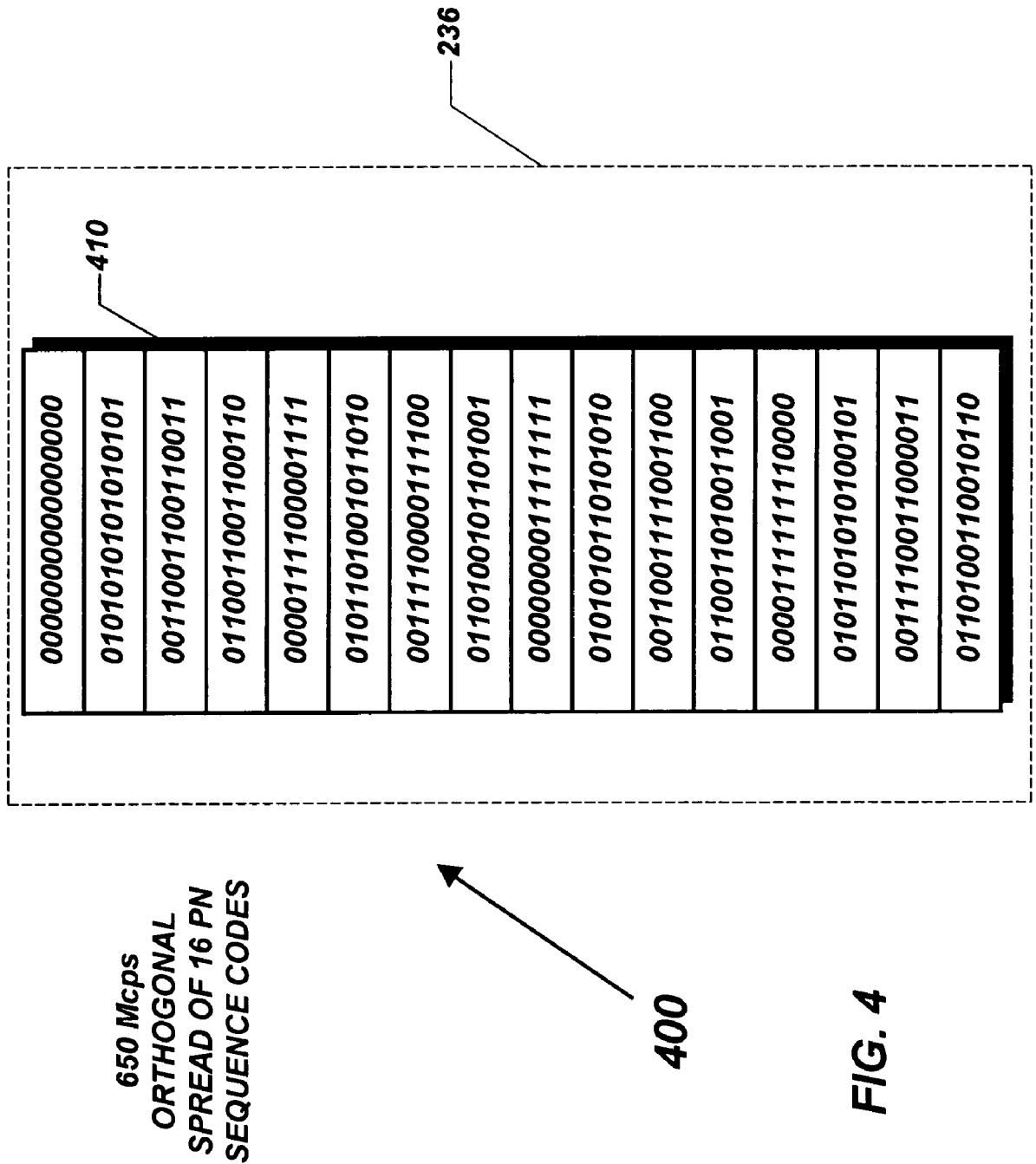
FIG. 4 is a table of 16 orthogonal spread codes in which each code has 16 PN sequence codes according to one embodiment.

FIG. 4 is a detailed table 410 of containing the 16 orthogonal spread sequences in the PN sequence look-up table 236. Each orthogonal code has 16 spread codes in the table 410. The orthogonal sequences have zero correlation. If the process of "XOR" is for two orthogonal binary sequences, the results are in an equal number of 1's and 0's. In the present embodiments, only 11 orthogonal sequences out of 16 orthogonal sequences in the table 410 are used for spreading in the 11 channels, thereby resulting in orthogonal channels.

Figure 5:
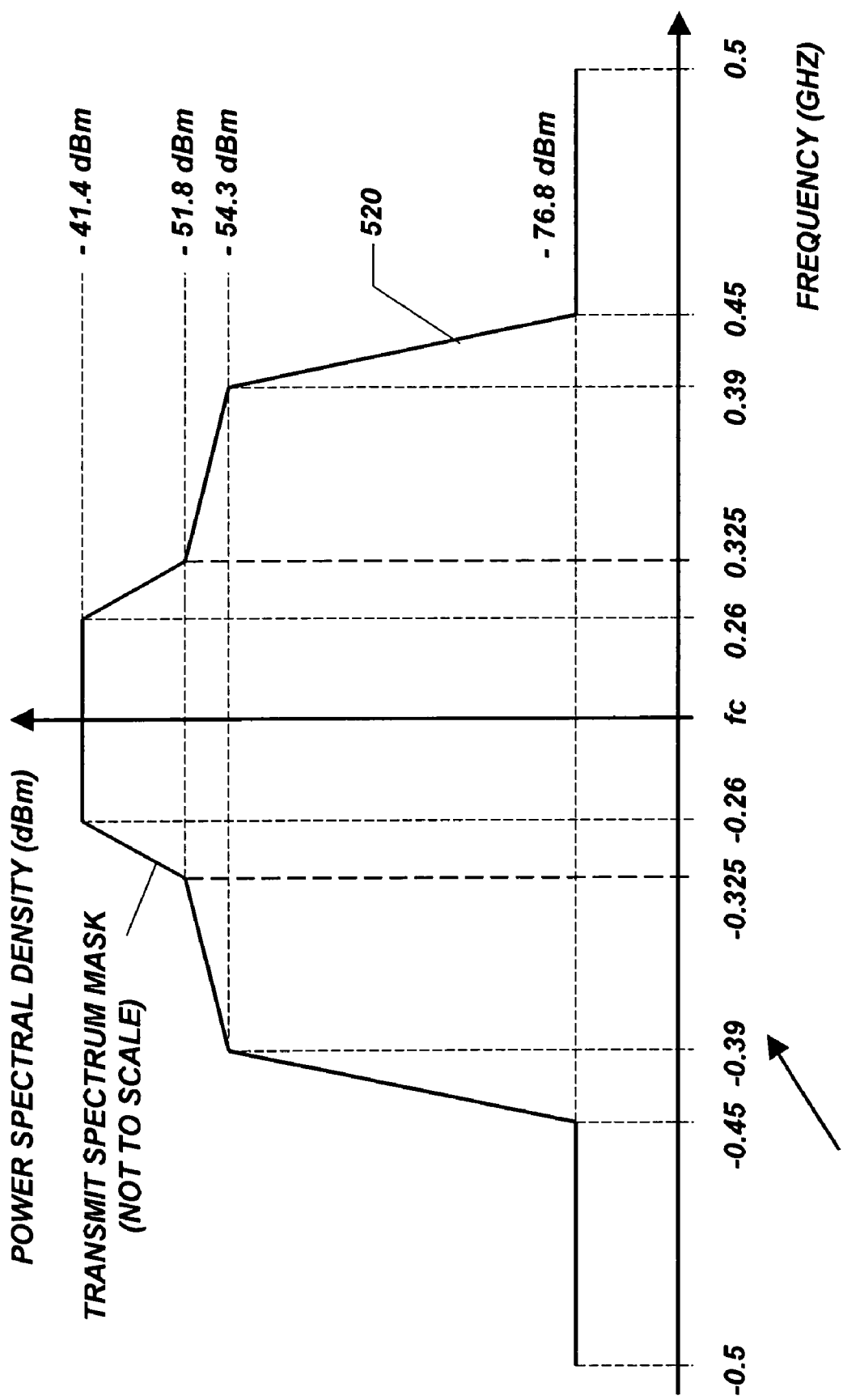
FIG. 5 is an indoor transmitter spectrum mark according to some embodiments.

FIG. 5 is an indoor transmitter spectrum mark 520 of a power spectral density 500 for each channel according to some embodiments. The magnitudes (dBm) of the frequency response with an error of $\pm\delta_i$ (i=1, 2, 3, 4) for corresponding frequencies (GHz) are given by, $$(-41.4-\delta_1) \leq |H(f)| \leq (-41.4+\delta_1), \quad |f-f_c| \leq 0.26, \tag{3}$$

$$|H(f)| \leq (-51.8+\delta_2), \quad |f-f_c| = 0.325, \tag{4}$$

$$|H(f)| \leq (-54.3+\delta_3), \quad |f-f_c| = 0.39, \tag{5}$$

$$|H(f)| \leq (-76.8+\delta_4), \quad 0.45 \leq |f-f_c| \leq 0.5. \tag{6}$$

The indoor transmit spectrum mark 520 serves as a rule for designing digital lowpass FIR shaping transmitter and receiver filters.

Figure 6:
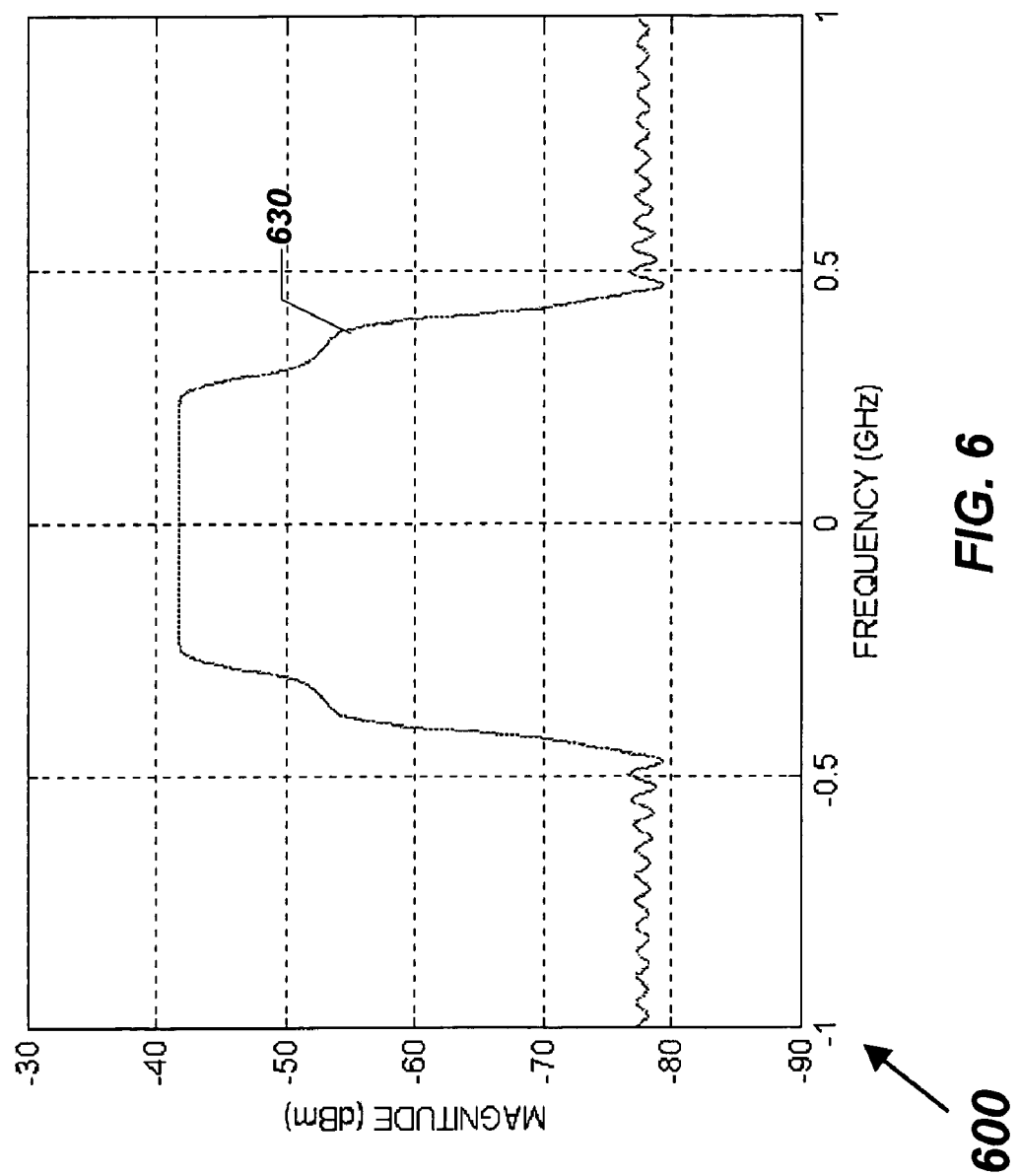
FIG. 6 is a frequency response of digital shaping transmitter and/or receiver FIR filter according to one embodiment.

Referring to FIG. 6 is a frequency response (dBm) of the digital lowpass FIR shaping transmitter and/or receiver filter 630 for the use in each channel according to one embodiment. The result of designing this digital lowpass FIR shaping transmitter filter 630 does meet the requirements of the power spectrum density 500 as defined in FIG. 5. The filter sampling rate $F_s$ may be great than or equal to 1 GHz. The present embodiment uses 2 GHz sampling rate for the digital lowpass FIR shaping transmitter filter 630. The digital lowpass FIR shaping filter 630 may be designed using least square method with different weighting functions for each frequency band. Other techniques such as equiripple approximations and windowing may also be used.

Figure 7:
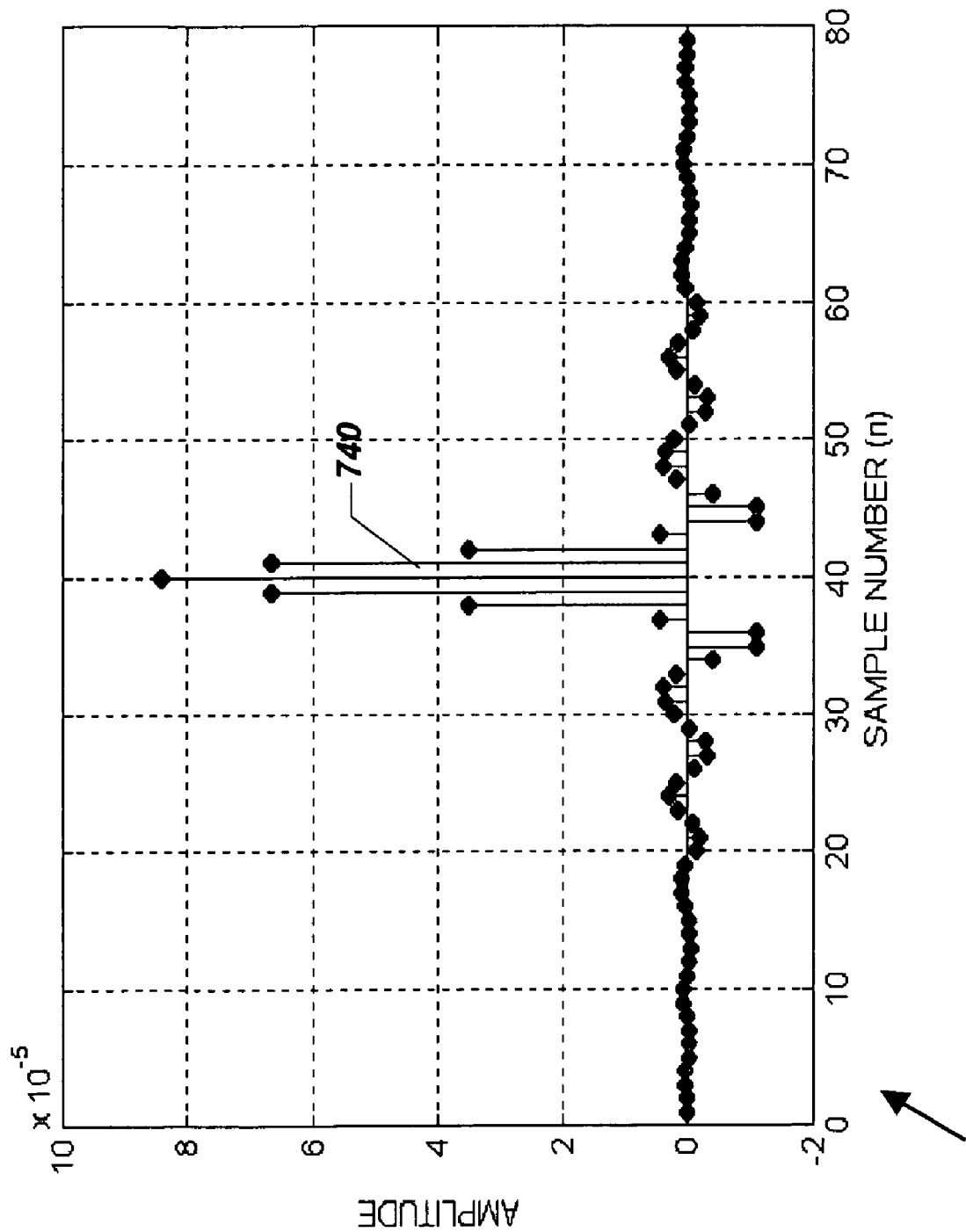
FIG. 7 is an impulse response of digital shaping transmitter and/or receiver FIR filter according to one embodiment.

Referring to FIG. 7 is an impulse response 740 of digital lowpass FIR shaping transmitter and/or receiver FIR filter according to one embodiment. This impulse response 740 of the digital lowpass FIR shaping transmitter filter is symmetric with a total of 79 filter coefficients. Table 2 lists all the filter coefficients. The filter coefficients in Table 1 are relatively small values. However, the filter coefficients can be expressed by h[n]=C(h[n]/C). Thus, a new set of digital lowpass FIR filter coefficients q[n] is given by $$q[n] = \frac{h[n]}{C}, \tag{7}$$

where C=$10^{-5}$, which is referred to as a constant amplitude of the digital lowpass FIR shaping filter 740. This expression in the equation (7) reduces the need of quantization bits for the filter coefficients.

TABLE 2

| Coefficients | Value |
|---|---|
| h[0] | 8.4011931856093516e−005 |
| h[−1], h[1] | 6.6460293297797776e−005 |
| h[−2], h[2] | 3.4899656505824461e−005 |
| h[−3], h[3] | 4.3116710798781203e−006 |
| h[−4], h[4] | −1.1214285545543695e−005 |
| h[−5], h[5] | −1.1091966005094216e−005 |
| h[−6], h[6] | −4.0631985867674594e−006 |
| h[−7], h[7] | 1.6925543297452028e−006 |
| h[−8], h[8] | 3.7995683513152043e−006 |
| h[−9], h[9] | 3.5715207002110990e−006 |
| h[−10], h[10] | 2.1069446071156423e−006 |
| h[−11], h[11] | −3.6643652826194515e−007 |
| h[−12], h[12] | −2.8164861523475095e−006 |
| h[−13], h[13] | −3.3131485713709617e−006 |
| h[−14], h[14] | −1.1423931641665744e−006 |
| h[−15], h[15] | 1.8766255546648780e−006 |
| h[−16], h[16] | 3.0434874609545600e−006 |
| h[−17], h[17] | 1.5335471709233686e−006 |
| h[−18], h[18] | −9.2517743205833720e−007 |
| h[−19], h[19] | −2.0795608829123639e−006 |
| h[−20], h[20] | −1.3294520798670319e−006 |
| h[−21], h[21] | 1.5173609022831139e−007 |
| h[−22], h[22] | 1.0025701140610793e−006 |
| h[−23], h[23] | 8.8427894743416094e−007 |
| h[−24], h[24] | 3.2126248293514667e−007 |
| h[−25], h[25] | −1.6257131448705735e−007 |
| h[−26], h[26] | −4.2373069355925035e−007 |
| h[−27], h[27] | −4.9081265774967211e−007 |
| h[−28], h[28] | −3.2008852157750218e−007 |
| h[−29], h[29] | 7.1976640681523624e−008 |
| h[−30], h[30] | 4.4865425611366231e−007 |
| h[−31], h[31] | 4.8145760999611724e−007 |
| h[−32], h[32] | 1.1716686662078990e−007 |
| h[−33], h[33] | −3.2175597663148811e−007 |
| h[−34], h[34] | −4.3124038368895124e−007 |
| h[−35], h[35] | −1.5028657655143136e−007 |
| h[−36], h[36] | 2.0356981673707622e−007 |
| h[−37], h[37] | 2.8036698051837603e−007 |
| h[−38], h[38] | 7.1364948530875849e−008 |
| h[−39], h[39] | −1.4582779654249872e−007 |

The implementation output y[n] of the digital lowpass FIR shaping transmitter filter with 79 symmetric coefficients can be expressed as, $$p[n] = \sum_{k=0}^{78} q[n]x[n-k], \tag{8}$$

and $$y[n]=Cp[n], \tag{9}$$

where q[n]=h[n]/C is the new set of the digital lowpass FIR shaping filter coefficients 740 and x[n] is the digital input signal. Since the digital lowpass FIR shaping transmitter filter 740 is symmetric coefficients, the above equation (8) can be rewritten as $$p[n] = \sum_{k=0}^{38} q[n](x[n-k] + x[n-78+k]) + q[39]x[n-39], \tag{10}$$

and $$y[n] = Cp[n]. \tag{11}$$

The equation (10) can be implemented with saving half computation complexities and with reducing the number of quantization bits for the digital lowpass FIR shaping transmitter filter 740.

Figure 8:
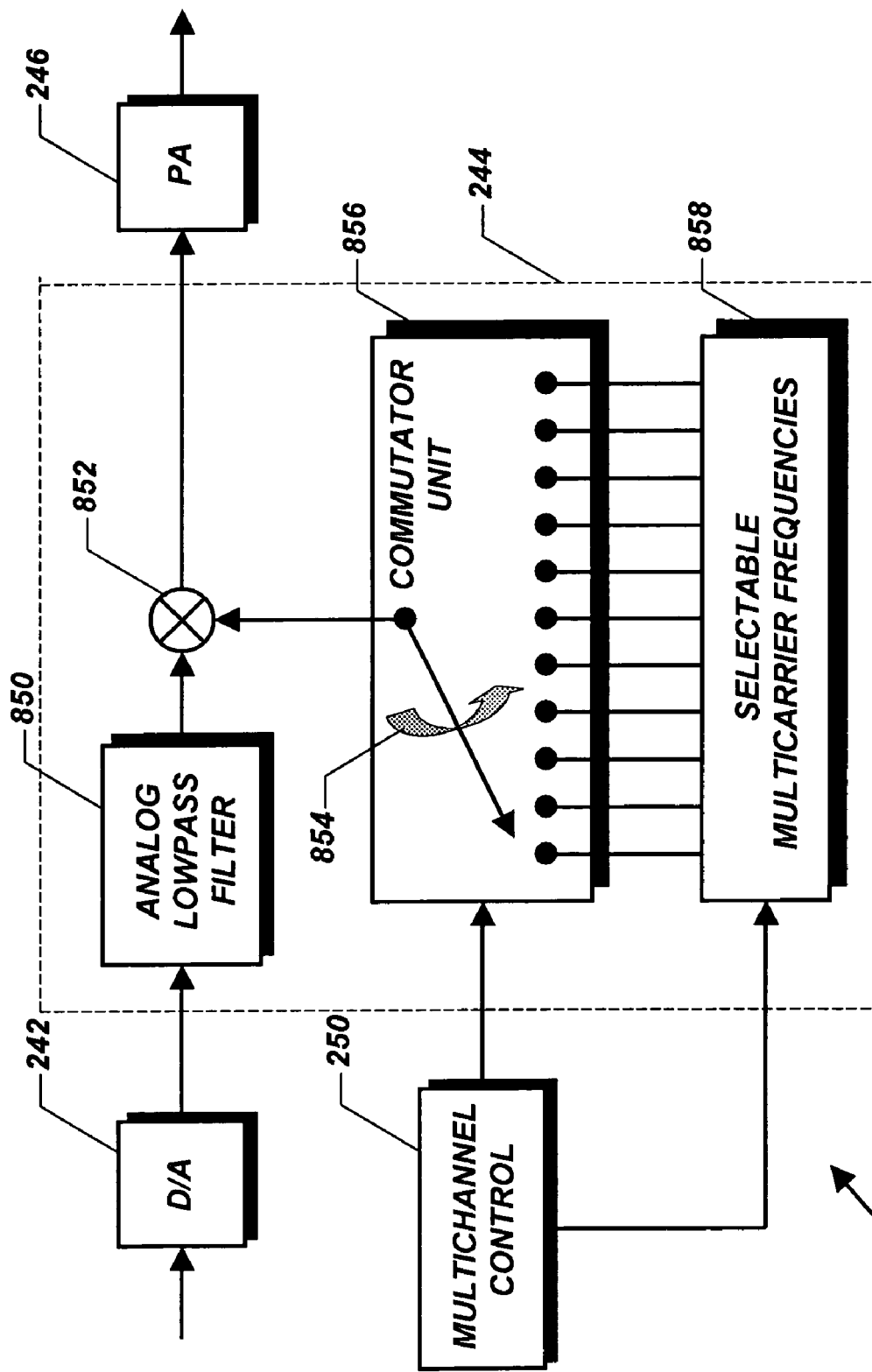
FIG. 8 is a block diagram of one embodiment of the multichannel based multi-carrier modulation according to some embodiments.

FIG. 8 is a block diagram 800 of the multichannel-based multi-carrier modulator 244 according to some embodiments. The output signal of the D/A converter 242 is first passed through an analog lowpass filter 850 in which reconstructs and smoothes the UWB signal into a time-domain UWB signal. The time-domain UWB signal is multiplied 852 by one of the multi-carriers of the commutator unit 856. The commutator unit 856 can select one of the multi-carriers from selectable multi-carrier frequencies 858 by using a switch function 854. Both the commutator unit 856 and the selectable multi-carrier frequencies 858 are controlled to form a serial multi-carrier signal by the multichannel control 250. Then, the time-domain UWB signals with multi-carriers are sequentially passed the PA 246 through an antenna into air.

Figure 9:
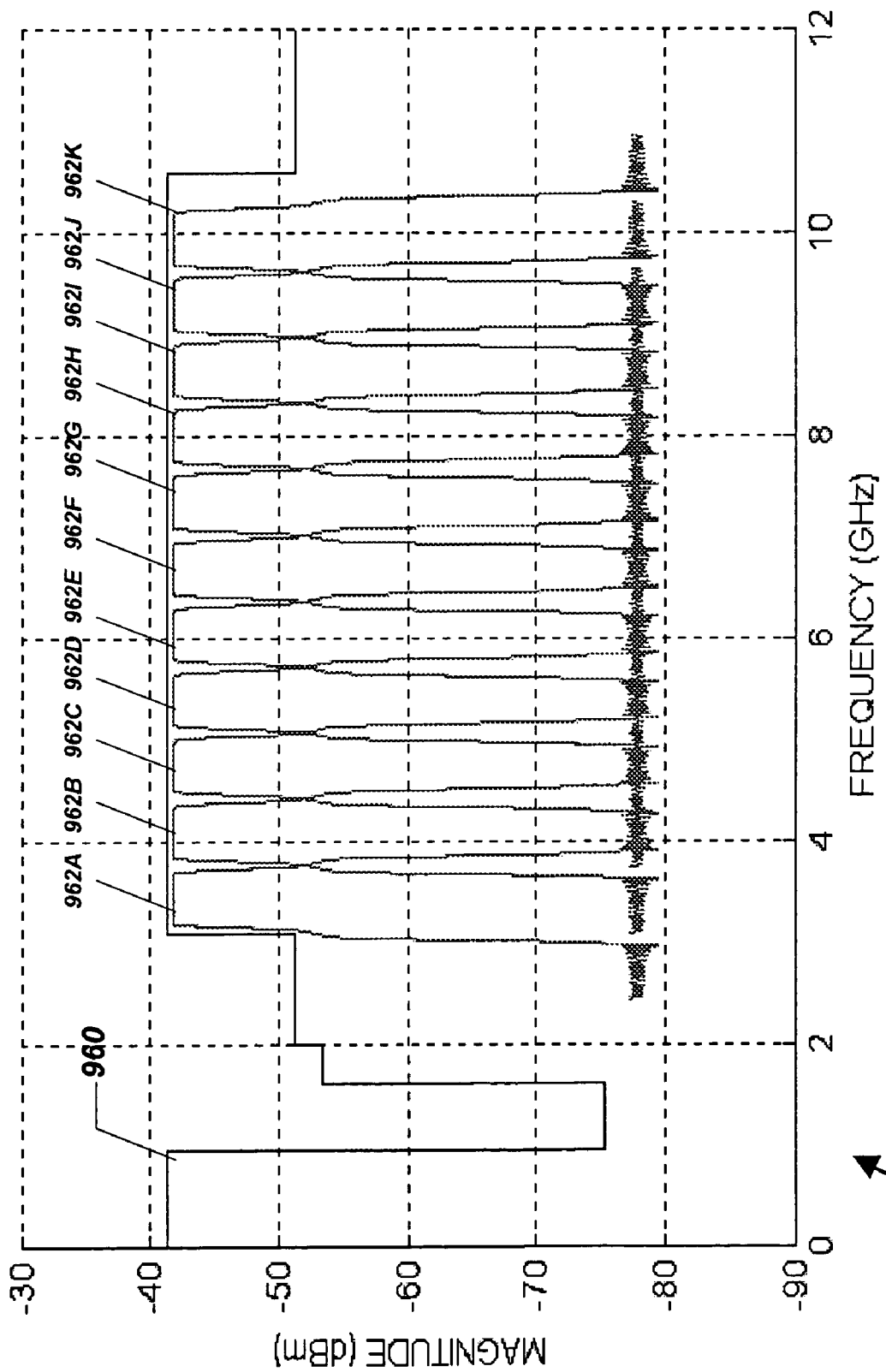
FIG. 9 is a frequency spectrum including eleven transmitter channel spectrums along with an indoor FCC emission limit according to some embodiments.

Referring to FIG. 9, which is an output of multi-carrier frequency spectrums (dBm) 900 including 11 transmitter channel spectrums 962A-962K along with the indoor FCC emission limitation 960 according to some embodiments. Each channel frequency bandwidth is 650 MHz and is fitted under the indoor FCC emission limitation 960 with different carrier frequencies. The detail positions of each transmitter channel spectrums (dBm) along with the center, lower and upper frequencies (GHz) as well as channel frequency bandwidth (MHz) are listed in Table 3.

TABLE 3

| Label of transmitter channels | Center Frequency (GHz) | Lower Frequency (GHz) | Upper Frequency (GHz) | Frequency Bandwidth (MHz) |
| --- | --- | --- | --- | --- |
| 962A | 3.45 | 3.125 | 3.775 | 650 |
| 962B | 4.10 | 3.775 | 4.425 | 650 |
| 962C | 4.75 | 4.425 | 5.075 | 650 |
| 962D | 5.40 | 5.075 | 5.725 | 650 |
| 962E | 6.05 | 5.725 | 6.375 | 650 |
| 962F | 6.70 | 6.375 | 7.025 | 650 |
| 962G | 7.35 | 7.025 | 7.675 | 650 |
| 962H | 8.00 | 7.675 | 8.325 | 650 |
| 962I | 8.65 | 8.325 | 8.975 | 650 |
| 962J | 9.30 | 8.975 | 9.625 | 650 |
| 962K | 9.95 | 9.625 | 10.275 | 650 |

Figure 10:
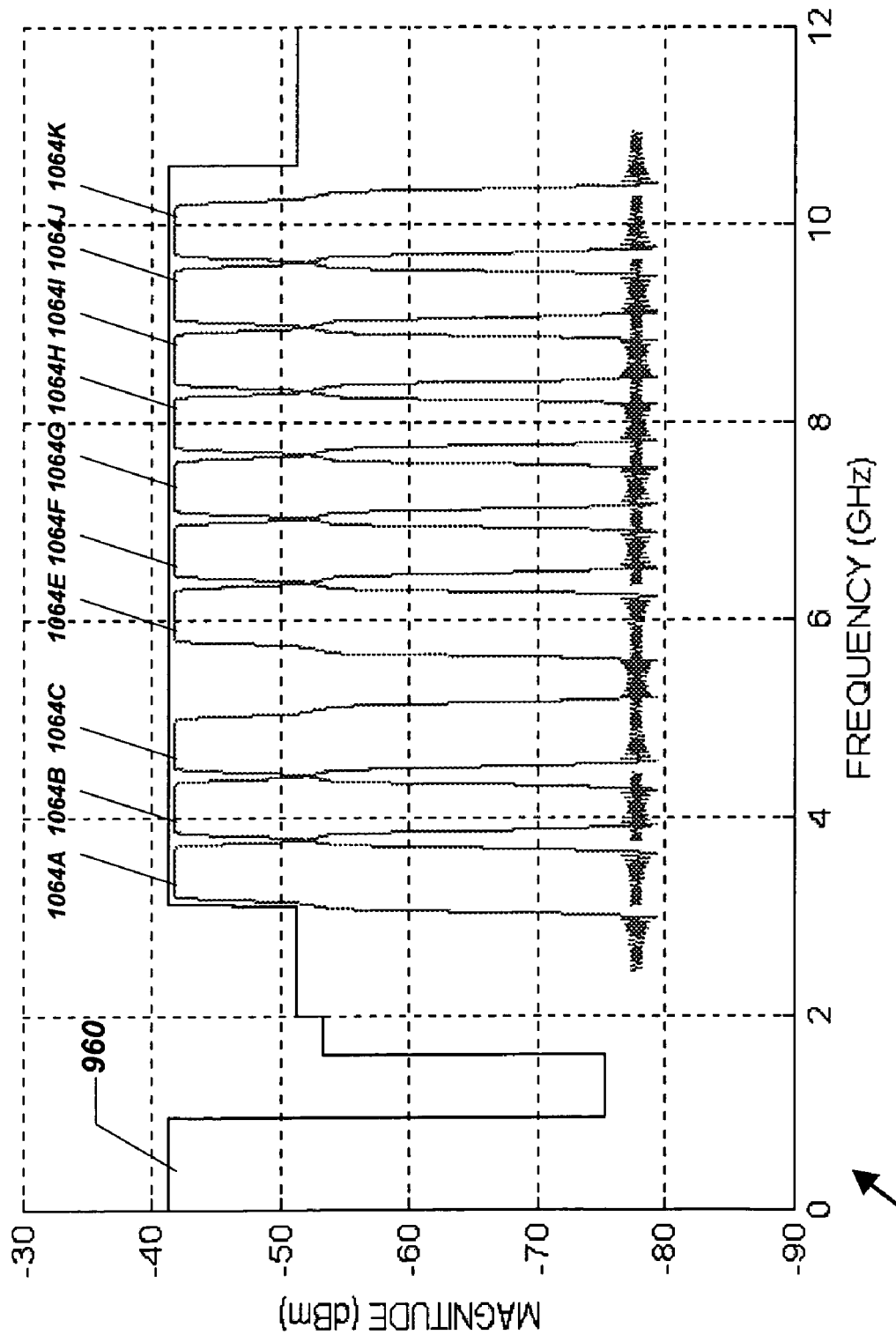
FIG. 10 is a frequency spectrum including ten transmitter channel spectrums without the fourth channel along with an indoor FCC emission limit according to some embodiments.

Referring to FIG. 10 is an output of multi-carrier frequency spectrums 1000 including 10 transmitter channel spectrums 1064A-1064C, 1064E-1064K, along with the indoor FCC emission limitation 960 according to some embodiments. There is no fourth channel with a frequency range from 5.075 GHz to 5.725 GHz in the frequency spectrums 1000. By not transmitting the fourth channel, the interference between indoor UWB communication devices and WLAN 802.11a lower band can be avoided since the WLAN 802.11a lower band is in the frequency range from 5.15 GHz to 5.35 GHz, thereby resulting in coexistence.

Figure 11:
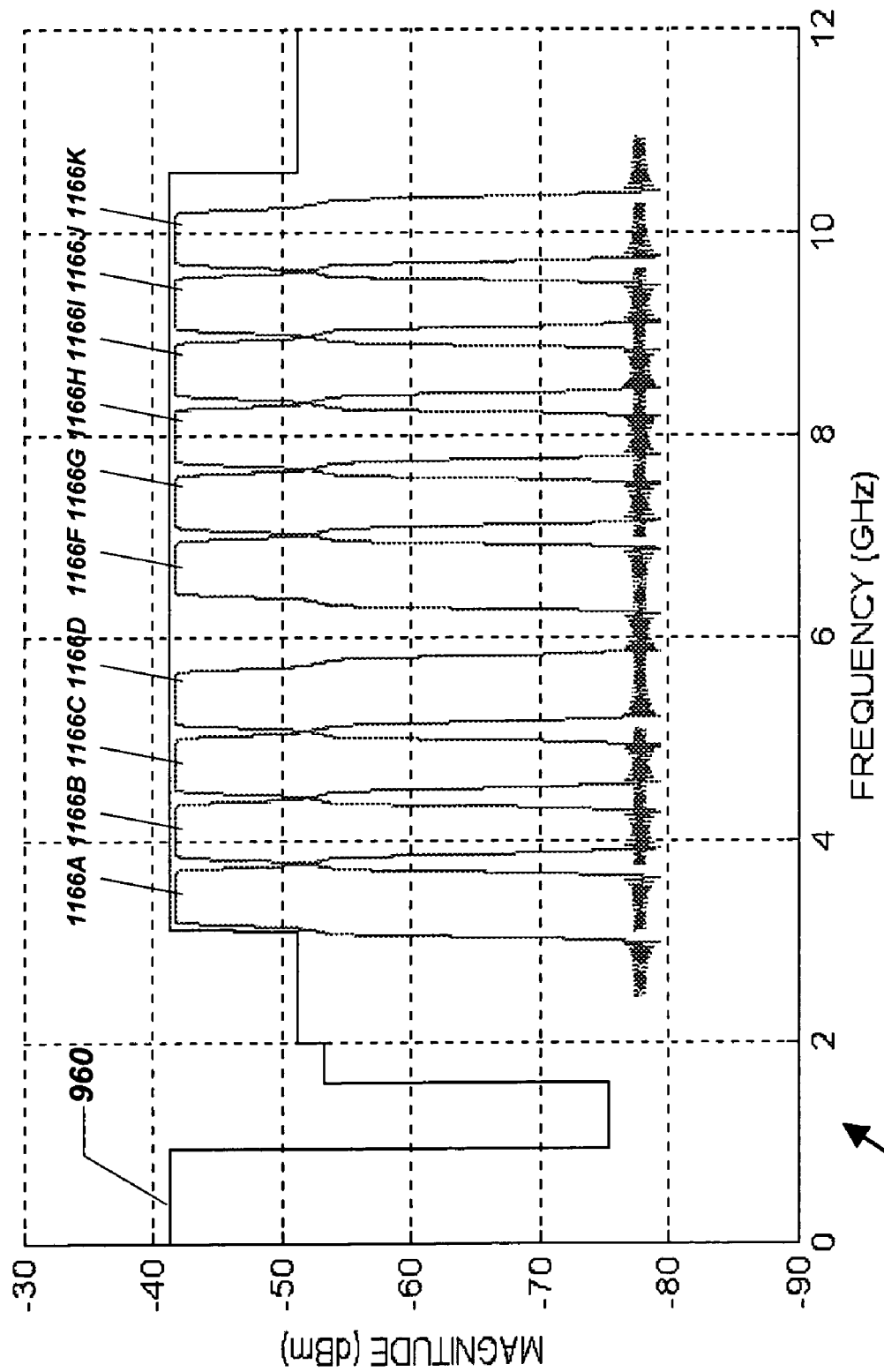
FIG. 11 is a frequency spectrum including ten transmitter channel spectrums without the fifth channel along with an indoor FCC emission limit according to some embodiments.

Referring to FIG. 11 is an output of multi-carrier frequency spectrums 1100 including 10 transmitter channel spectrums 1166A-1166D, 1166F-1166K, along with the indoor FCC emission limitation 960 according to some embodiments. Note that there is no fifth channel with a frequency range from 5.725 GHz to 6.375 GHz in the frequency spectrums 1100. By not transmitting the fifth channel, the interference between UWB communication devices and WLAN 802.11a upper band can be eliminated. This is because the WLAN 802.11a upper band is in the frequency range from 5.725 GHz to 5.825 GHz, thereby resulting in UWB and WLAN 802.11a coexistence.

Figure 12:
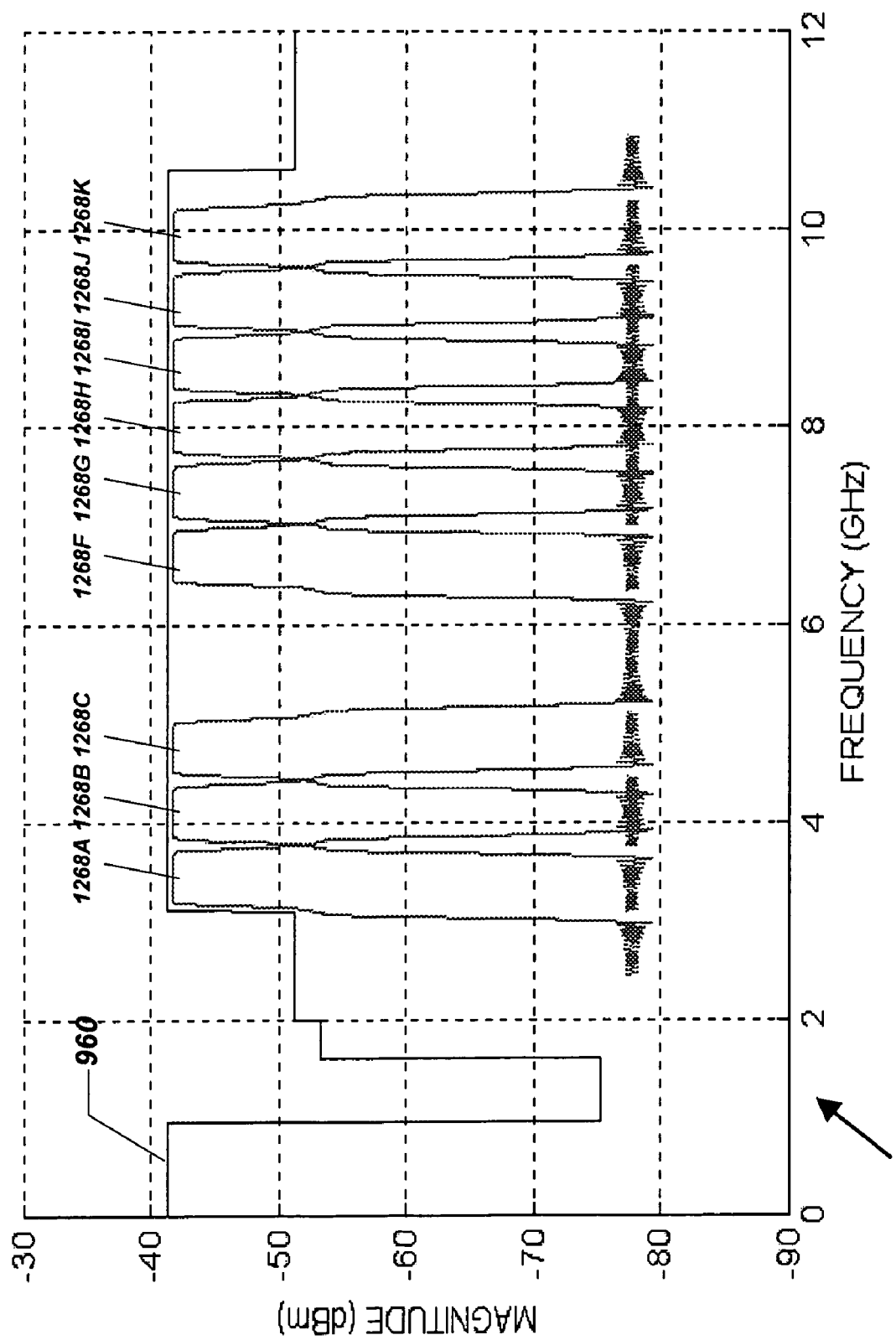
FIG. 12 is a frequency spectrum including nine transmitter channel spectrums without the fourth and fifth channel along with an indoor FCC emission limit according to some embodiments.

Now referring to FIG. 12 is an output of multi-carrier frequency spectrums 1200 including 9 transmitter channel spectrums 1268A-1268C, 1268F-1268K, along with the indoor FCC emission limitation 960 according to some embodiments. The frequency spectrum 1200 does not include both of the fourth and the fifth channels with a frequency range from 5.075 GHz to 6.375 GHz. By not transmitting the fourth and fifth channels at the same time, the interference between UWB communication devices and WLAN 802.11a lower and upper bands can be avoided. This is because the WLAN 802.11a lower and upper bands are in the frequency ranges from 5.150 GHz to 5.350 GHz and from 5.725 GHz to 5.825 GHz, respectively. As a result, the interference can be avoided between indoor UWB devices and WLAN 802.11a devices by not transmitting the fourth and fifth channels of the spread spectrum based multichannel modulation for UWB communication devices.

Figure 13:
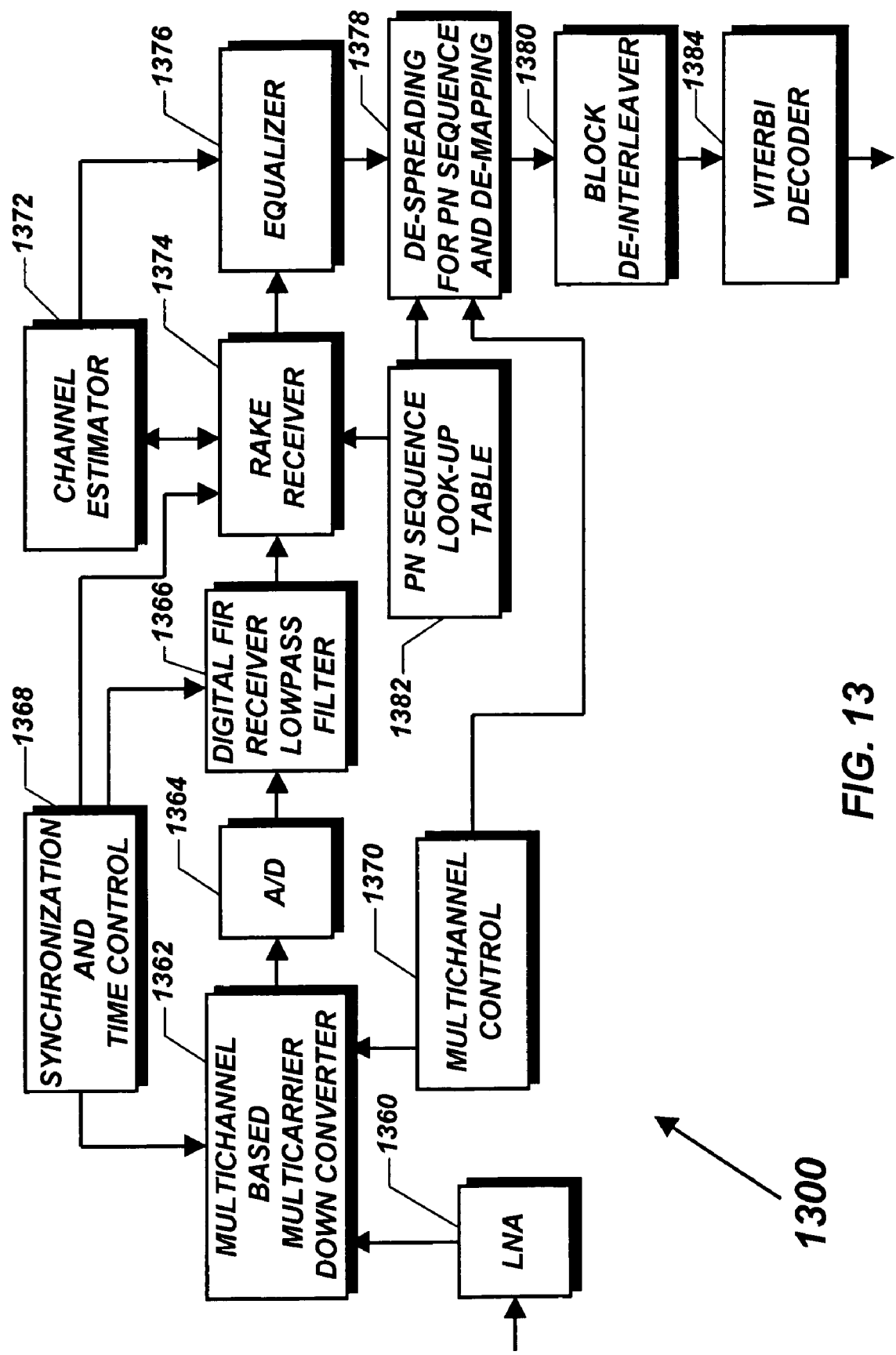
FIG. 13 is a block diagram of a spread spectrum based multichannel demodulation UWB receiver according to some embodiments.

FIG. 13 is a block diagram of spread spectrum based multichannel demodulation UWB receiver 1300 according to some embodiments. A low noise amplifier (LNA) 1360, which is coupled to a multichannel based multi-carrier down converter 1362, receives the UWB signals from an antenna. The output of the LNA 1360 is passed through the multichannel based multi-carrier down converter 1362 to produce baseband signal for an A/D converter 1364. A multichannel control 1370 and synchronization and time control 1368 restrain the multichannel-based multi-carrier down converter 1362. The bandlimited UWB analog signals are then sampled and quantized by using the A/D converter 1364, with the sampling rate at ≧650 MHz. The digital UWB signals of the output of the A/D converter 1364 are filtered by using a digital FIR receiver lowpass filter 1366 to remove the out of band signals with controlling from the synchronization and time control 1368. The output data from the digital FIR receiver lowpass filter 1366 is used for a rake receiver 1374. A channel estimator 1372 is used to estimate channel phase and frequency that are passed into the rake receiver 1374. The rake receiver 1374 calculates a correlation between the received UWB signals and the channel spread sequences, which are provided by using the PN sequence look-up table 1382, and performs coherent combination. The output of the rake receiver 1374 is passed to an equalizer 1376, which also receives the information from the channel estimator 1372, to eliminate inter-symbol interference (ISI) and inter-channel interference (ICI). Then, the output of the equalizer 1376 produces the signals for a de-spreading of PN sequence and de-mapping 1378 to form the UWB signals of symbol rate at 446.875 Msps. The symbol data is de-interleaved by using a block de-interleaver 1380. Thus, the output data of the block de-interleaver 1380 is used for the Viterbi decoder 1384 to decode the encoded data and to produce the information data bits at 223.4375 Mbps.

Figure 14:
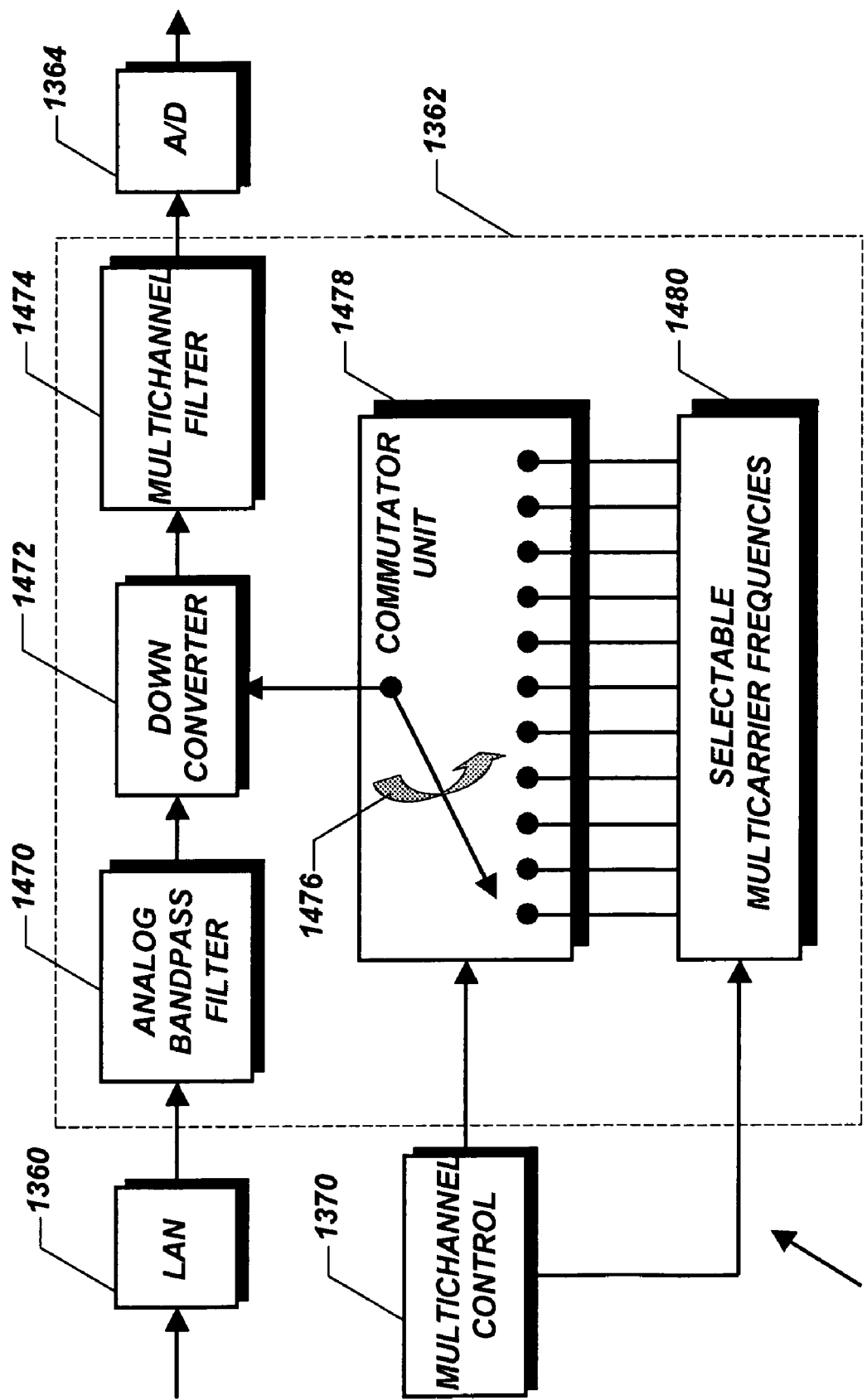
FIG. 14 is a block diagram of one embodiment of the multichannel and multi-carrier-based down converter of the present invention.

Referring to FIG. 14, which is a detailed block diagram 1400 showing one embodiment of the multichannel based multi-carrier down converter 1362 of the present invention. The analog bandpass filter 1470 receives the signals from the LNA 1360 to produce the bandlimited signals for a down converter 1472. The down converter 1472 then generates the baseband signals by multiplying a multi-carrier signal from a commutator unit 1478, which selects one of 11 multi-carriers from selectable multi-carrier frequencies 1480 by a switch 1476. The output of the down converter 1472 is passed through a multichannel filter 1474 to reduce the unwanted signal bands. Thus, the bandlimited signal is passed to the A/D converter 1364 with the sampling rate at $\geq 650$ MHz.

While the present inventions have been described with respect to a limited number of embodiments, those skilled in the art will appreciate numerous modifications and variations therefrom. It is intended that the appended claims cover all such modifications and variations as fall within the true spirit and scope of these present inventions.

What is claimed is:

1. A spread spectrum based multichannel modulation Ultra-Wideband (UWB) communication transceiver for comprising:
   - a pseudorandom noise (PN) sequence look-up table coupled to a multichannel PN sequence mapping;
   - the multichannel PN sequence mapping coupled to a digital lowpass finite impulse response (FIR) shaping filter; and
   - the digital lowpass FIR shaping filter coupled to a digital-to-analog (D/A) converter;
   - wherein multichannel PN sequence mapping comprises:
   - N-I delay units coupled to N down sampling units followed by N Exclusive OR (XOR) units in parallel, and said N XOR units connected to a PN sequence look-up table, where N is an integer and greater than 1.

2. The spread spectrum based multichannel UWB communication system of claim 1 wherein said N XOR units can be controlled to spread Q symbols in parallel with L PN chips from the PN sequence look-up table, where N, Q and L are integers, N and Q are greater than 1, and L is greater than or equal to 1.

3. The spread spectrum based multichannel UWB communication system of claim 1 wherein said multichannel PN sequence mapping is used to form N UWB multichannel signals in parallel, where N is an integer and greater than 1.

4. The spread spectrum based multichannel UWB communication system of claim 3 wherein each of the N UWB multichannel signals has a chip data rate of 650 Mcps approximately, where N is an integer and greater than 1.

5. The spread spectrum based multichannel UWB communication system of claim 2 wherein each of said N XOR units is programmable, where N is an integer and greater than 1.

6. The spread spectrum based multichannel UWB communication system of claim 3 wherein each of said N UWB multichannel signals can be turn on or off by using a switch, where N is an integer and greater than 1.

7. The spread spectrum based multichannel UWB communication system of claim 4 wherein said N UWB multichannel signals have a total chip data rate of 650N Mcps, where N is an integer and greater than 1.

8. The spread spectrum based multichannel UWB communication system of claim 3 wherein said multichannel PN sequence mapping produces a scalability data rate in a step of increasing or decreasing 650 Mcps.

9. A spread spectrum based multichannel modulation Ultra-Wideband (UWB) communication receiver comprising:
   - a low noise amplifier (LNA); a multichannel-based multicarrier down converter; an analog-to-digital (A/D) converter;
   - a digital receiver lowpass finite impulse response (FIR) filter;
   - a rake receiver; an equalizer;
   - a despreading for pseudorandom noise (PN) sequence and demapping;
   - a block deinterleaver; a decoder;
   - a PN sequence look-up table coupled to the rake receiver and the despreading for PN sequence and demapping;
   - an channel estimator coupled to the rake receiver and the equalizer;
   - a synchronization and time control connected to the multichannel-based multicarrier downconverter, the digital receiver lowpass FIR filter, and the rake receiver;
   - and a multichannel control connected to the multichannel-based multicarrier downconverter, and the despreading for PN sequence and demapping;
   - wherein the despreading for a pseudorandom noise (PN) sequence and demapping produces an UWB symbol rate at 446 Msps.

* * * * *